Aug. 29, 1933.    C. ANDREWS    1,924,343
BICYCLE BASKET
Filed Jan. 12, 1931
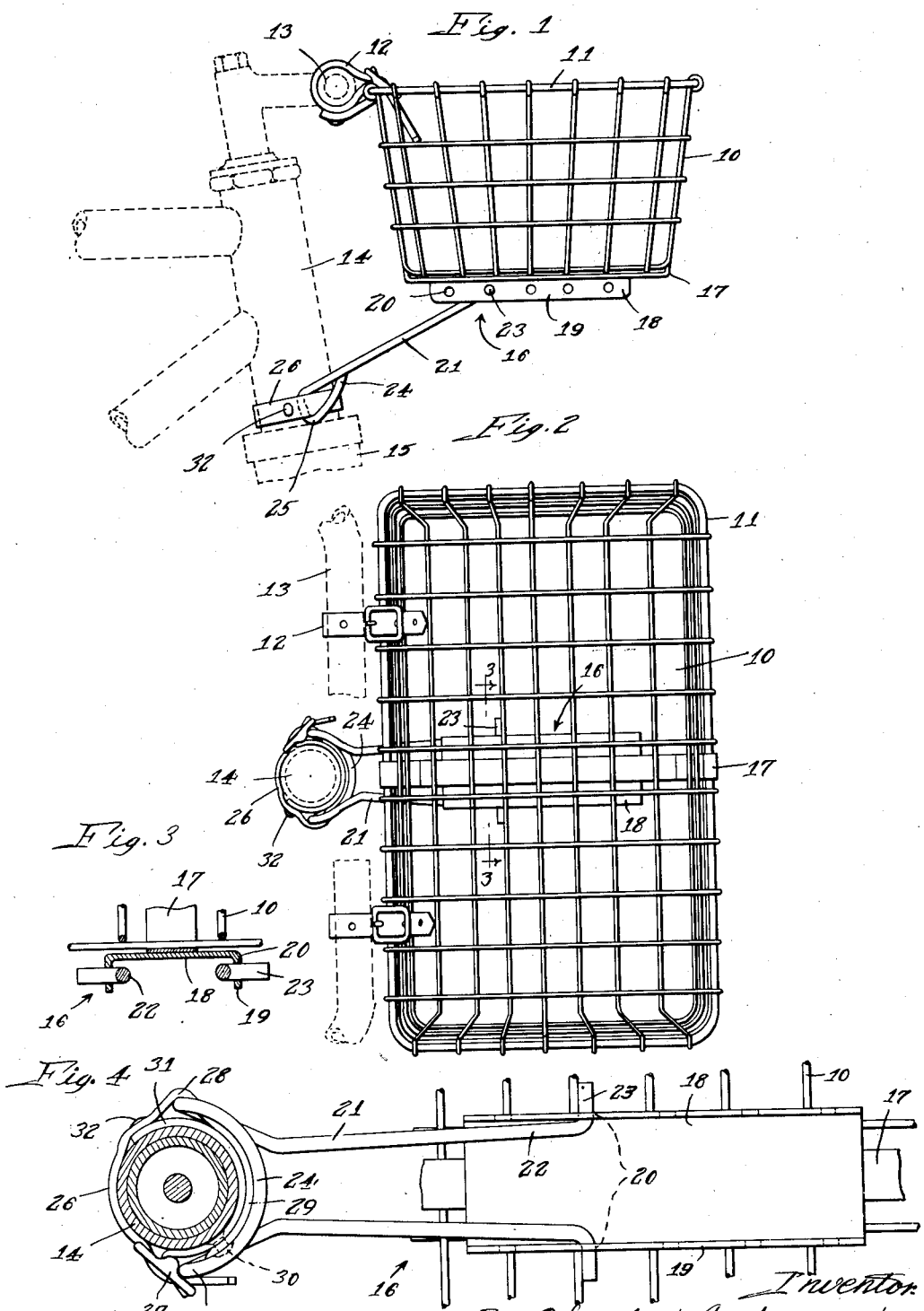

Patented Aug. 29, 1933

1,924,343

UNITED STATES PATENT OFFICE 1,924,343

BICYCLE BASKET

Charles Andrews, Rockford, Ill., assignor to The Washburn Company, Worcester, Mass., a corporation of Massachusetts Application January 12, 1931. Serial No. 508,043

9 Claims. (Cl. 224—32)

This invention relates to bicycle baskets.

The principal object of my invention is to provide a basket having a bottom support of improved construction which affords the desired range of adjustability for proper mounting of the basket on different makes of bicycles, regardless of the length of head or the particular form of handlebar, and, furthermore, enables the adjustment to be made quickly by hand, there being nothing requiring a screw driver or other tool for loosening and tightening when the adjustment is made.

Another object consists in forming the brace constituting a part of the bottom support of one piece of wire in such a way that the strap used in connection therewith to fasten it to the head protects the head from being marred, the metal to metal contact being avoided. This construction also avoids the rattle that otherwise went with the use of a carrier basket.

The invention is illustrated in the accompanying drawing, in which—

Figure 1 is a side view of a bicycle basket embodying my invention, the method of mounting the same being indicated by the dotted outline of the front of the bicycle;

Fig. 2 is a plan view of Figure 1;

Fig. 3 is a sectional detail taken on the line 3—3 of Fig. 2, and

Fig. 4 is a view on a larger scale looking at the bottom of the basket so as to show the support to best advantage.

The same reference numerals are applied to corresponding parts throughout the views.

Bicycle baskets, such as are herein contemplated, are used for carrying small packages on the handlebar. The basket, such as that designated by the numeral 10 in Figure 1, is suitably made of wire and fastened by its top frame 11, as by means of a pair of straps 12 to the handlebar which is indicated in dotted lines at 13. Under the circumstances, the bottom of the basket has to be braced in some way from the head 14 so as to be held level or approximately so, while permitting movement of the basket with the handlebar in steering. A portion of the front fork 15 to which the handlebar is attached, appears in Figure 1. The bottom support for the basket made in accordance with my invention is indicated generally by the reference numeral 16 and its construction is fully set forth in the following description.

The basket 10 has a sheet metal frame piece 17 extending across the bottom of the basket from front to rear and upwardly at both ends for attachment to the top frame 11. To this piece I secure an elongated channel member 18 suitably formed of sheet metal. The channel member 18 can be spot welded or otherwise suitably secured by its web portion to the piece 17, with the longitudinal flanges 19 thereof reaching downwardly as shown. The two flanges are pierced so as to provide a plurality of pairs of aligned holes 20 at points spaced lengthwise of the channel member. A supporting brace 21 formed from a single piece of heavy wire bent to approximately U form has the two arms 22 thereof reaching forwardly and upwardly between the flanges 19 for reception of the outwardly bent ends 23 in any selected pair of holes 20. The brace is bent upon itself at the other end so that the bight portion 24, being reversed, is conformed to the front of the head 14. At the same time, eyes are formed between the bight portion and the arms 22, as indicated at 25, for reception of the strap 26 for fastening the brace to the head 14. As shown most clearly in Fig. 4, I prefer to have the buckle 27 for the strap 26 fastened in a loop of the strap at one eye and then to have the strap extend through the other eye, as at 28, and bearing against the inside of the bight portion 24, as at 29, so as to protect the head 14 from abrasion by the bight portion. The one eye at the buckle 27 is, of course, covered by the strap, the buckle and eye being both received in the same loop of the strap, and I prefer not to have the strap terminate at the rivet 30, by means of which the buckle is fastened to the strap, but to have that end of the strap extended from the rivet 30 to a point past the other eye, as indicated at 31, and then fastened, as at 32, to the rest of the strap, so as to cover up the other eye which would otherwise be left exposed and allowed to have contact with the head. In that way the head is completely protected from being marred by the brace.

It should be apparent from the foregoing that the brace can be adjusted forwardly or rearwardly with respect to the bottom of the basket by simply forcing the arms 22 toward each other so as to withdraw the bent ends 23 from the holes 20, whereupon these ends can be inserted into other holes and the arms allowed to spread again to the condition shown in Fig. 4. The brace is preferably formed so that when the bent ends 23 are entered in the holes 20, the arms are still slightly under constraint and tend to spread farther. That avoids any likelihood of the parts rattling. The provision of five sets of aligned holes for reception of the brace in that many different possible positions is enough to assure the proper fastening of the basket to any make or model of bicycle, regardless of the length of the head, and regardless of the particular form of handlebar used, although, of course, any other suitable number of positions of adjustment could be provided for. The fact that one can change the setting of the brace by hand, there being no screws or bolts to loosen and tighten, is, of course, quite an advantage. Then, too, the fact that the enamel finish on the head is protected is highly desirable, especialy since it is frequently desired to remove the basket when it is not to be used.

I claim:

1. A bottom support for a bicycle basket comprising in combination with a basket, an elongated channel-shaped member on the bottom of the basket with the flanges thereof extending downwardly, said flanges having a plurality of pairs of aligned holes provided therein at points spaced lengthwise thereof, and a brace having means at one end thereof for fastening the same to the head of a bicycle, the other end of said brace being received between the flanges of the aforesaid member, the same having means projecting outwardly therefrom on opposite sides thereof for entry in aligned holes in said flanges, said means being normally disposed entered in said holes but being retractable therefrom for selective entry detachably into any pair of aligned holes.

2. A bottom support for a bicycle basket comprising in combination with a basket, an elongated channel-shaped member on the bottom of the basket with the flanges thereof extending downwardly, said flanges having a plurality of pairs of aligned holes provided therein at points spaced lengthwise thereof, and a brace having means at one end thereof for fastening the same to the head of a bicycle, said brace having a forked portion whereby to provide a pair of resilient arms arranged each to cooperate with one flange of the aforesaid member, the ends of said arms projecting substantially at right angles for detachable entry in the aligned holes in said flanges, said arms normally occupying a position with the projecting ends thereof received in said holes but being arranged to be sprung for removal of said ends from said holes whereby to permit selective entry thereof detachably into any pair of aligned holes.

3. A bottom support for a bicycle basket comprising in combination with a basket, a member on the bottom of the basket having a downwardly projecting flange thereon disposed in a fore and aft plane with respect to the basket, said flange having a plurality of holes provided therein spaced lengthwise thereof, and a brace for cooperation with said member having means at one end for attachment of the brace to the head of a bicycle, and a resilient arm at the other end of said member having a laterally projecting end normally received in one of said holes, said arm being arranged to be sprung for the removal of the end thereof from a hole whereby to permit selective entry thereof detachably into any one of said holes.

4. A bottom support for a bicycle basket comprising in combination with a basket, attaching means on the bottom of the basket providing a pair of spaced longitudinal, downwardly extending flanges, said flanges having a plurality of pairs of aligned recesses provided therein at points spaced lengthwise thereof, and a one-piece wire brace bent to substantially U form so as to provide a pair of arms reaching forwardly from the head of a bicycle toward the channel member, the ends of said arms being bent substantially at right angles for entry in aligned recesses in the flanges of said member, said arms being arranged to be sprung to permit removal of the bent ends from one pair of recesses and entry thereof detachably in another pair, and means for securing said brace at its other end to the head of the bicycle.

5. A bottom support for a bicycle basket comprising in combination with a basket, an elongated channel-shaped member on the bottom of the basket with the flanges thereof extending downwardly, said flanges having a plurality of pairs of aligned holes provided therein at points spaced lengthwise thereof, and a brace having means at one end thereof for fastening the same to the head of a bicycle, the other end of said brace being formed to provide portions disposed alongside the flanges of the aforesaid member, and means on said portions entering the aligned holes in said flanges, said means being normally disposed entered in said holes but being retractable therefrom for selective entry detachably into any pair of aligned holes.

6. A bottom support for a bicycle basket comprising in combination with a basket, a member on the bottom of the basket having a downwardly projecting flange thereon disposed in a fore and aft plane with respect to said basket, said flange having a plurality of holes provided therein spaced lengthwise thereof, and a brace having means at one end thereof for fastening the same to the head of a bicycle, the other end of said brace being formed to provide a portion disposed alongside the flange of the aforesaid member, and means on said portion entered in one of the holes in said flange, said means being retractable therefrom for selective entry detachably into any other one of said holes.

7. In a bottom support for a bicycle basket, comprising attaching means on the bottom of the basket, a one-piece wire brace bent to substantially U form so as to provide a pair of arms reaching forwardly from the head of a bicycle toward the attaching means, said arms being secured to the attaching means, the other end of the brace being conformed at the bight portion of the U to provide a pair of opposed eyes, and means for fastening that end of the brace to the head of the bicycle comprising a strap passed through the eyes and around the head, said strap being formed to provide a loop, and a buckle for the strap disposed in said loop along with one of the eyes of said brace, the end of the strap forming the loop being elongated so as to extend past the inside of the other eye, whereby the head is protected from contact with the brace.

8. In a bottom support for a bicycle basket, comprising attaching means on the bottom of the basket, a one-piece wire brace bent to substantially U form so as to provide a pair of arms reaching forwardly from the head of a bicycle toward the attaching means, said arms being secured to the attaching means, the bight portion of the U of the brace being bent upon itself to conform the same approximately to the front of the head of the bicycle, and so as to form a pair of opposed eyes at opposite sides of the bight portion, and means for fastening the brace to the head comprising a strap passed through the eyes and around the head, said strap being formed to provide a loop, and a buckle for the strap disposed in said loop along with one of the eyes of said brace, the end of the strap forming the loop being elongated so as to extend past the inside of the other eye and fastened to the rest of the strap, whereby the head is protected from contact with the brace, the bight portion of the brace being disposed so as to come into abutment with the outside of the strap, whereby to protect the head from contact therewith.

9. A bicycle basket comprising a receptacle having a supporting member on the bottom thereof extending from front to rear thereof and provided with a series of longitudinally spaced holes therein, means on the top of the receptacle for fastening the same in place on a bicycle, and a bottom brace for said receptacle having means at the rear end for attaching the same to the bicycle, and having means at the front end for detachably pivotally connecting the same on a horizontal transverse axis in any one of the holes in the member on the bottom of the receptacle, the construction described permitting adjustment of the front end of said brace forwardly and rearwardly relative to the bottom of the receptacle, and the pivotal feature of said connection serving to permit placing said brace at any required angle relative to the bottom of the receptacle at the point of connection with said supporting member.

CHARLES ANDREWS.